Patented Nov. 8, 1949

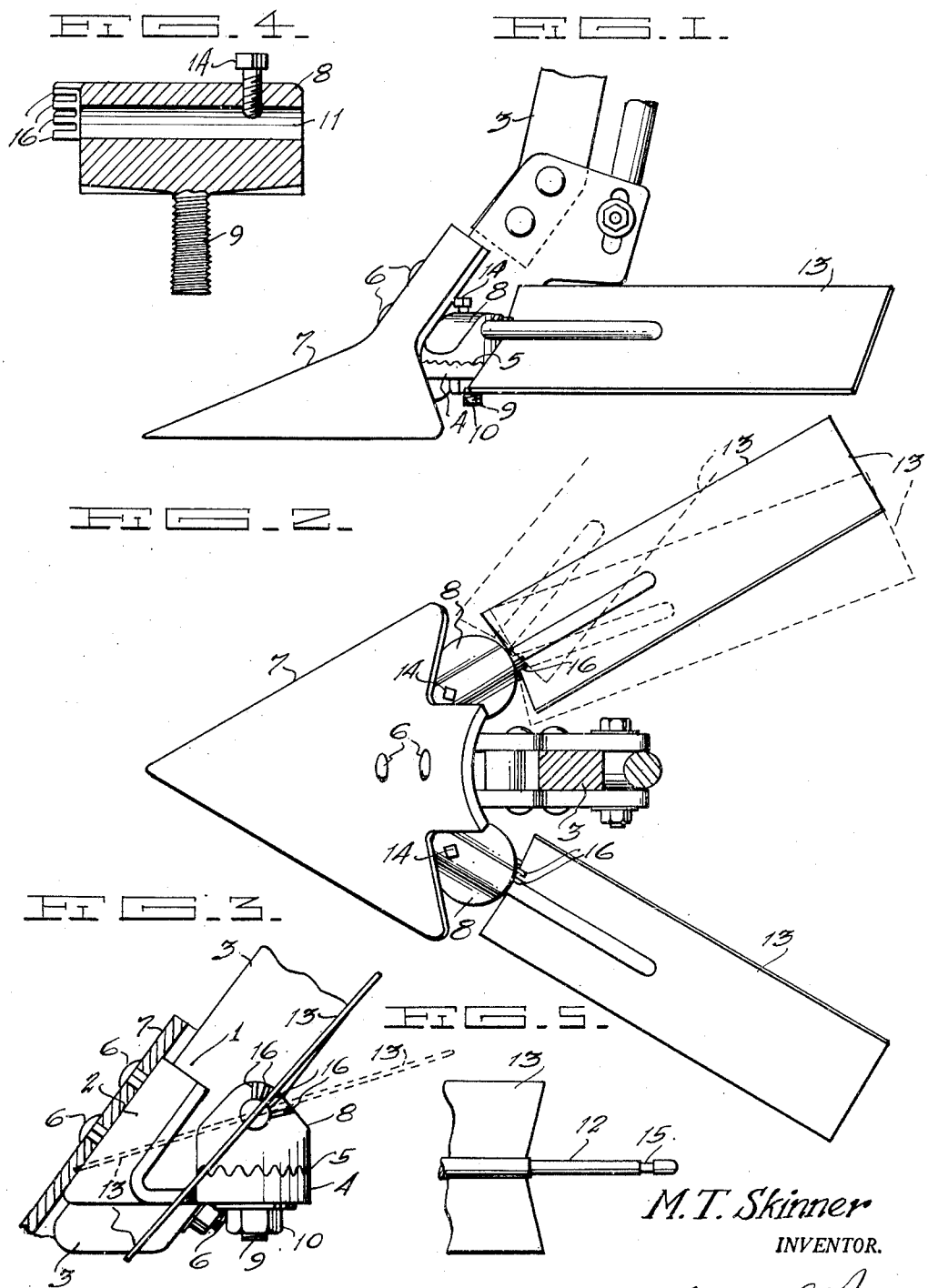

2,487,737

UNITED STATES PATENT OFFICE 2,487,737

ADJUSTABLE PLOW SWEEP

M. T. Skinner, Walnut Springs, Tex., assignor of twenty-five per cent to James R. Callan and Avo Callan, Dallas, and twenty-five per cent to John L. McTigue, Houston, Tex.

Application March 30, 1945, Serial No. 585,744

2 Claims. (Cl. 97—205)

This invention relates to agricultural implements and it has particular reference to detachable and adjustable wings for a cultivating sweep of the type generally employed in gangs on either horse or tractor drawn implements and its principal object resides in the provision of an arrangement of parts whereby the wings of a sweep may be made adjustable so as to properly deflect the soil in any desired manner in the cultivation of different types of plants.

Another object of the invention resides in the provision of a cultivating instrument which may be employed either as a shovel without the conventional wings of a sweep or for such operations as harvesting peanuts, potatoes, or the like, wherein the use of substantially wide spread wings are desirable.

An object of the invention is manifest in the provision of a casting capable of attachment to the shank of a cultivator, or other similar implement, to which a conventional shovel or wingless sweep is attached and affording adjustable mountings for wings extending outwardly and rearwardly from the said sweep and thus provide for changing the incidence of angulation of the wings with respect to the said sweep.

Broadly, the invention seeks to comprehend the provision of an implement which can be readily adapted for various uses by simply adjusting the wings and thus provide for changes in the operations to be performed without changing to different sized sweeps.

While the foregoing objects are paramount, other and lesser objects will become manifest as the description proceeds taken in connection with the appended drawings wherein:

Figure 1 illustrates the invention in side elevation showing a wingless sweep attached to a shank and showing the adjustable wings in position.

Figure 2 is a plan view of the invention illustrating, in dotted lines, the various positions to which the wings can be adjusted horizontally.

Figure 3 fragmentarily illustrates a conventional shank to which the adjustable wings are connected and illustrating the casting by which the wings are supported and made pivotally adjustable.

Figure 4 is a detailed cross-sectional illustration of one of the pivotally adjustable clamps holding the adjustable wings, and Figure 5 fragmentarily illustrates one of the wings and shows the spindle by which these members are pivotally connected to the clamps.

The invention therefore comprises a casting 1 formed with an attaching standard 2, normally conforming to the conventional angle of the shank 3 to which the casting is attached as in Figure 3. An integral ear 4 extends rearwardly and horizontally from each side of the standard 2 and the shanks 3 and each are preferably circular in form and have their upper faces 5 formed with radial arrangements of corrugations whose purpose will presently become manifest.

The casting 1 is secured to the shank 3 of the implement (not shown) by the same bolts 6 by which the sweep 7 is attached, the latter being placed upon the standard 2 of the casting 1, as in Figure 3, and the bolts 6, extending through the shank 3, are secured.

Clamp members 8, preferably circular in form and having their under surfaces radially corrugated to conform to the faces 5 of the ears 4, are pivotally supported on the latter by integral studs 9 extending downwardly through an aperture in the center of each of the ears 4. A nut 10 is threaded upon the lower ends of the studs 9 to firmly secure the clamps 8 to the ears 4 when the proper adjustment is made.

Each of the clamps 8 have tubular passages 11 therethrough providing receptacles for the spindles 12 on each of the wings 13, shown in Figures 1 and 2, whereby the latter may be pivotally adjusted to any desired angle and fixed thereon by set screws 14 threaded into the tops of the clamps 8 and into circumferential grooves 15 on the spindles 12. A series of spaced projections 16 are integral with each of the clamps and arranged on the operative faces thereof so that the inner edges of the wings or blades 13 can be inserted therebetween to insure their retention in the desired angle. This arrangement is illustrated particularly in Figure 3.

It will be observed, therefore, that the wings 13 can be positioned at different angles with respect to the sweep 7 on a horizontal plane and also have their incidence of inclination varied and fixed as desired. In this manner the implement can be utilized for any desired handling of the soil in cultivation depending upon the particular plant involved or the operation required.

It is obvious that certain changes and modifications may be resorted to from time to time without departing from the spirit of the invention or the scope of the appended claims.

What is claimed is:

1. In combination with a cultivating implement having a shank and a sweep attached to said shank, a casting providing a frog for said sweep on said shank and formed with integral, horizontally arranged ears, clamps arranged on said ears for horizontal pivotal adjustment thereon, wing members, each having a spindle, pivotally supported in said clamp members whereby said wing members are capable of both pivotal and horizontal adjustment with respect to said shank.

2. In combination with a cultivating implement having a shank and a sweep attached to said shank, a frog for said sweep capable of detachable securement to said shank and formed with a pair of integral horizontally disposed ears, a clamp secured to each of said ears for adjustable horizontal rotation thereon, wing members having spindles secured in said clamps for pivotal and horizontal adjustment with respect to said sweep, the said clamps having integral spaced projections thereon engageable with the ends of said wings in adjusted positions.

M. T. SKINNER.

REFERENCES CITED

The following references are of record in the file of this patent:

UNITED STATES PATENTS

| Number | Name | Date |
| --- | --- | --- |
| 1,230,233 | Skinner | June 19, 1917 |
| 1,532,556 | Skinner | Apr. 7, 1925 |